(12) United States Patent
Chen (10) Patent No.: US 10,377,918 B2
(45) Date of Patent: Aug. 13, 2019

(54) FIBER COATING WITH FAST CURE SPEED

(71) Applicant: Corning Incorporated, Corning, NY (US)

(72) Inventor: Yangbin Chen, Lima, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/118,706

(22) Filed: Aug. 31, 2018

(65) Prior Publication Data

US 2019/0092968 A1 Mar. 28, 2019

Related U.S. Application Data

(60) Provisional application No. 62/563,782, filed on Sep. 27, 2017.

(30) Foreign Application Priority Data

Oct. 27, 2017 (NL) ...................................... 2019821

(51) Int. Cl.
| | | |
|---|---|---|
| *C09D 175/16* | (2006.01) | |
| *G02B 6/02* | (2006.01) | |
| *C03C 25/106* | (2018.01) | |
| *C08G 18/48* | (2006.01) | |
| *C08G 18/75* | (2006.01) | |
| *C08G 18/24* | (2006.01) | |
| *C08F 2/48* | (2006.01) | |
| *C08K 5/01* | (2006.01) | |

(Continued)

(52) U.S. Cl.
CPC .......... *C09D 175/16* (2013.01); *C03C 25/106* (2013.01); *C08G 18/246* (2013.01); *C08G 18/4825* (2013.01); *C08G 18/758* (2013.01); *G02B 6/02* (2013.01); *G02B 6/02395* (2013.01); *C08F 2/48* (2013.01); *C08K 5/01* (2013.01); *C08K 5/07* (2013.01); *C08K 5/45* (2013.01)

(58) Field of Classification Search
CPC .. C09D 175/16; C08G 18/758; C08G 18/246; C08G 18/4825; C08G 18/672; C08G 18/48; G02B 6/02; G02B 6/02395; C03C 25/106; C08K 5/07; C08K 5/01; C08K 5/45; C08F 2/48
See application file for complete search history.

(56) References Cited

U.S. PATENT DOCUMENTS

| | | |
|---|---|---|
| 4,076,380 A | 2/1978 | DiMarcello et al. |
| 4,176,911 A | 12/1979 | Marcatili et al. |

(Continued)

FOREIGN PATENT DOCUMENTS

| | | |
|---|---|---|
| WO | 1998047954 A1 | 10/1998 |
| WO | 2011081519 A1 | 7/2011 |
| WO | 2015037828 A1 | 3/2015 |

OTHER PUBLICATIONS

Dutch Patent Application No. NL2019821 mailed Aug. 9, 2018; 12 Pages; European Patent Office.

*Primary Examiner* — Andrew Jordan
(74) *Attorney, Agent, or Firm* — Kevin L. Bray (57) ABSTRACT

A coating composition that exhibits high cure speed is described. The coating composition includes one or more monomers, one or more oligomers, and a photoinitiator. The coating composition further includes a photo sensitizer that acts in cooperation with a photoinitiator to increase cure speed.

22 Claims, 3 Drawing Sheets

(51) Int. Cl.
*C08K 5/45* (2006.01)
*C08K 5/07* (2006.01)

(56) References Cited

U.S. PATENT DOCUMENTS

| | | | |
|---|---|---|---|
| 4,300,930 A | 11/1981 | Chang | |
| 4,402,570 A | 9/1983 | Chang | |
| 4,439,008 A | 3/1984 | Joormann et al. | |
| 5,729,645 A | 3/1998 | Garito et al. | |
| 6,187,835 B1 | 2/2001 | Szum et al. | |
| 6,316,516 B1 | 11/2001 | Chien et al. | |
| 6,563,996 B1 | 5/2003 | Winningham | |
| 7,166,649 B2 * | 1/2007 | Day | C08G 18/672 |
| | | | 522/96 |
| 7,423,105 B2 | 9/2008 | Winningham | |
| 8,849,082 B2 | 9/2014 | Bookbinder et al. | |
| 9,057,817 B2 | 6/2015 | Bookbinder et al. | |
| 9,383,511 B2 | 7/2016 | Bickham et al. | |
| 9,810,838 B2 * | 11/2017 | Chen | G02B 6/02395 |
| 10,222,547 B2 * | 3/2019 | Chen | C03C 25/1061 |
| 2005/0065310 A1 * | 3/2005 | Wang | C08G 18/10 |
| | | | 528/44 |
| 2006/0258829 A1 * | 11/2006 | Wang | C08G 18/10 |
| | | | 526/319 |
| 2009/0250166 A1 * | 10/2009 | Pachl | C08F 2/48 |
| | | | 156/308.2 |
| 2013/0312904 A1 * | 11/2013 | Pachl | C08F 2/48 |
| | | | 156/275.5 |
| 2015/0071595 A1 * | 3/2015 | Chen | G02B 6/02395 |
| | | | 385/123 |
| 2017/0153389 A1 * | 6/2017 | Chen | C03C 25/1061 |
| 2018/0127593 A1 * | 5/2018 | Chen | C03C 25/106 |
| 2019/0092968 A1 * | 3/2019 | Chen | C09D 175/16 |

\* cited by examiner

FIBER COATING WITH FAST CURE SPEED

This application claims the benefit of priority to Dutch Patent Application No. 2019821, filed on Oct. 27, 2017, which claims the benefit of priority under 35 U.S.C. § 119 of U.S. Provisional Application Ser. No. 62/563,782 filed on Sep. 27, 2017 the content of which is relied upon and incorporated herein by reference in its entirety.

FIELD

This description pertains to fiber coatings and fiber coating compositions that exhibit fast cure speed. More particularly, this description pertains to fiber coating compositions that include a photosensitizer and photoinitiator that improve cure speed. Most particularly, this description pertains to fiber coatings with high tensile toughness capable of being produced at high cure speed.

BACKGROUND

The transmission of light through an optical fiber is highly dependent on the properties of the coatings applied to the fiber. The coatings typically include a primary coating and a secondary coating, where the secondary coating surrounds the primary coating and the primary coating contacts the glass waveguide (core+cladding) portion of the fiber. The secondary coating is a harder material (higher Young's modulus) than the primary coating and is designed to protect the glass waveguide from damage caused by abrasion or external forces that arise during processing and handling of the fiber. The primary coating is a softer material (lower Young's modulus) and is designed to buffer or dissipates stresses that result from forces applied to the outer surface of the secondary coating. Dissipation of stresses within the primary layer attenuates the stress and minimizes the stress that reaches the glass waveguide. The primary coating is especially important in dissipating stresses that arise when the fiber is bent. The bending stresses transmitted to the glass waveguide on the fiber needs to be minimized because bending stresses create local perturbations in the refractive index profile of the glass waveguide. The local refractive index perturbations lead to intensity losses for the light transmitted through the waveguide. By dissipating stresses, the primary coating minimizes bend-induced intensity losses.

In the manufacture of optical fibers, a fiber is drawn from a glass preform, thinned to an appropriate diameter (e.g. 125 µm), coated with primary and secondary coatings, and wound on a spool for storage. There is currently a desire to increase draw speed to improve the efficiency of fiber manufacturing. One factor that limits draw speed is the speed of forming the coatings on the fiber. The primary and secondary coatings are typically formed by first applying primary and secondary coating compositions to the glass fiber and then reacting the coating compositions to form primary and secondary coatings. Typically, the primary and secondary coating compositions include photoinitiators and radiation-curable monomers and/or oligomers, and the reaction to form primary and secondary coatings is induced by curing with radiation. As draw speed increases, the need for coating compositions having faster cure speeds becomes more pressing.

SUMMARY

Coating compositions featuring high cure speed and coatings formed from the coating compositions are described. The curable coating compositions include a monomer component, an oligomer component, a photoinitiator, and a photosensitizer. The monomer component includes one or more curable monomers. The oligomer component includes one or more curable oligomers. Curing is preferably accomplished with radiation in the UV, visible, or infrared portion of the electromagnetic spectrum.

The present disclosure extends to:
A coating composition comprising:
  an oligomer component, the oligomer component comprising the reaction product of a composition that includes:
    a diisocyanate compound;
    a hydroxy (meth)acrylate compound; and
    a polyol compound,
    wherein the diisocyanate compound, the hydroxy (meth) acrylate compound and the polyol compound are present in the molar ratio n:m:p, respectively, where n is in the range from 3.0 to 5.0, m is in the range from 1.50n-3 to 2.50n-5, and p is 2; and
  a photosensitizer.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The present description relates to curable optical fiber coating compositions, coatings formed from the curable coating compositions, and coated optical fibers encapsulated by the coating cured from the curable coating compositions. The present description also relates to methods of making curable coating compositions, methods of forming coatings from the curable coating compositions, and methods of coating fibers with the curable coating composition. The coating compositions have high cure speed and coatings formed from the coating compositions have high tensile toughness. The coating compositions include a photosensitizer that increases the rate of the curing reaction, which leads to high cure speeds.

In the description that follows, various components of coating compositions will be discussed and the amounts of particular components in the coating composition will be specified in terms of weight percent (wt %) or parts per hundred (pph). The components of the coating composition include base components and additives. The concentration of base components will be expressed in terms of wt % and the concentration of additives will be expressed in terms of pph.

As used herein, the weight percent of a particular base component refers to the amount of the component present in the coating composition on a basis that excludes additives. The additive-free coating composition includes only base components and is referred to herein as a base composition or base coating composition. Any crosslinker component(s), diluent component(s), non-radiation-curable reinforcing agent(s), photosensitizer(s), and polymerization initiator(s) present in a coating composition are regarded individually as base components and collectively as a base composition. The base composition minimally includes a radiation-curable component and a polymerization initiator. The radiation-curable component may be a radiation-curable crosslinker or a radiation-curable diluent. The radiation-curable component may be a monomer or an oligomer. The base composition may include one or more radiation-curable crosslinker components, one or more radiation-curable diluent components, one or more non-radiation-curable reinforcing agents, one or more photosensitizers, and one or more polymerization initiators. The collective amount of base components in a coating composition is regarded herein as equaling 100 weight percent.

Additives are optional and may include one or more of a UV absorber, an adhesion promoter, an antioxidant, a catalyst, a carrier or surfactant, a tackifier, a stabilizer, and an optical brightener. Representative additives are described in more detail hereinbelow. The amount of additives introduced into the coating composition is expressed herein in parts per hundred (pph) relative to the base composition. For example, if 1 g of a particular additive is added to 100 g of base composition, the concentration of additive is expressed herein as 1 pph.

One embodiment relates to a coated optical fiber. An example of a coated optical fiber is shown in schematic cross-sectional view in FIG. 1. Coated optical fiber 10 includes a glass optical fiber 11 surrounded by primary coating 16 and secondary coating 18. The primary coating 16 is the cured product of a coating composition in accordance with the present description.

Figure 1:
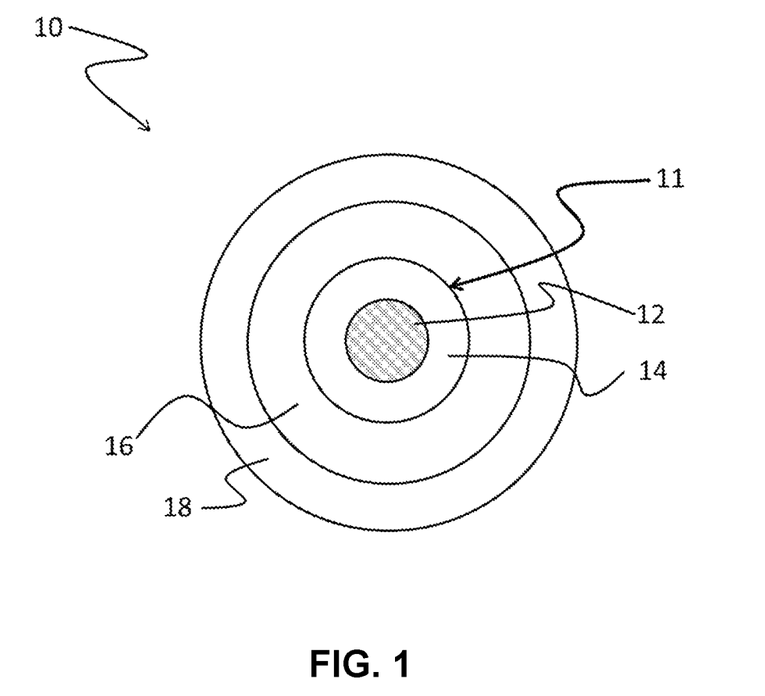
FIG. 1 is a schematic view of a coated optical fiber according one embodiment.
Figure 2:
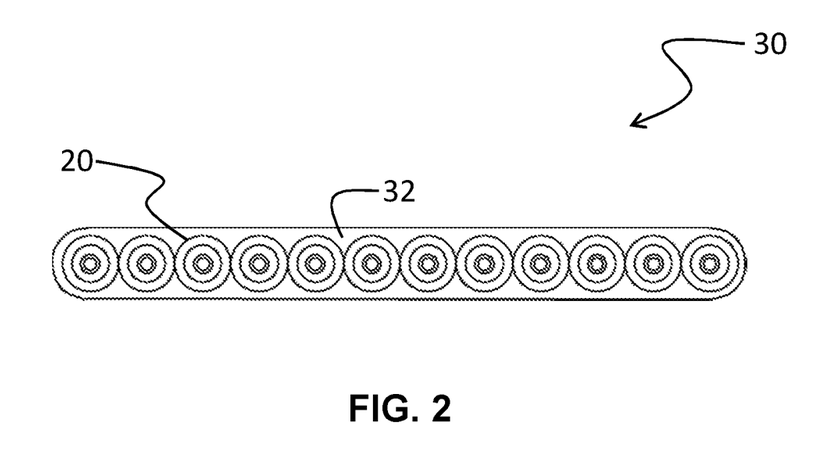
FIG. 2 is a schematic view of a representative optical fiber ribbon. The representative optical fiber ribbon includes twelve coated optical fibers.

The glass fiber 11 is an uncoated optical fiber including a core 12 and a cladding 14, as is familiar to the skilled artisan. Core 12 has a higher refractive index than cladding 14 and glass fiber 11 functions as a waveguide. In many applications, the core and cladding have a discernible core-cladding boundary. Alternatively, the core and cladding can lack a distinct boundary. One such fiber is a step-index fiber. Exemplary step-index fibers are described in U.S. Pat. Nos. 4,300,930 and 4,402,570 to Chang, the disclosure of each of which is hereby incorporated by reference in its entirety. Another such fiber is a graded-index fiber, which has a core whose refractive index varies with distance from the fiber center. A graded-index fiber is formed basically by diffusing the glass core and cladding layer into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., the disclosure of each of which is hereby incorporated by reference in its entirety. The cladding can include one or more layers. The one or more cladding layers can include an inner cladding layer that surrounds the core and an outer cladding layer that surrounds the inner cladding layer. The inner cladding layer and outer cladding layer differ in refractive index. For example, the inner cladding layer may have a lower refractive index than the outer cladding layer. A depressed index layer may also be positioned between the inner cladding layer and outer cladding layer. Exemplary fibers having multiple cladding layers are described in U.S. Pat. No. 9,057,817 to U.S. Pat. No. Bookbinder et al., U.S. Pat. No. 9,383,511 to Bickham et al., and U.S. Pat. No. 8,849,082 to Bookbinder et al., the disclosure of each of which is hereby incorporated by reference in its entirety herein.

The optical fiber may also be single or multi-moded at the wavelength of interest, e.g., 1310 or 1550 nm. The optical fiber may be adapted for use as a data transmission fiber (e.g.

SMF-28®, LEAF®, and METROCOR®, each of which is available from Corning Incorporated of Corning, N.Y.) Alternatively, the optical fiber may perform an amplification, dispersion compensation, or polarization maintenance function. The skilled artisan will appreciate that the coatings described herein are suitable for use with virtually any optical fiber for which protection from the environment is desired.

The primary coating 16 preferably has a higher refractive index than the cladding of the optical fiber in order to allow it to strip errant optical signals away from the optical fiber core. The primary coating should maintain adequate adhesion to the glass fiber during thermal and hydrolytic aging, yet be strippable therefrom for splicing purposes. The primary coating typically has a thickness in the range of 25-40 µm (e.g. about 32.5 µm). Primary coatings are typically applied to the glass fiber as a viscous liquid and cured, as will be described in more detail herein below.

The present coatings are the cured product of a coating composition that includes a curable component, a photosensitizer, and a photoinitiator. Curable components include curable monomers and curable oligomers. A non-radiation-curable reinforcing agent is optionally also present. The coating composition may include one or more curable monomers, one or more curable oligomers, one or more non-radiation-curable reinforcing agents, one or more photosensitizers, and/or one or more photoinitiators. In one embodiment, the curable oligomer is essentially free of urethane and urea functional groups. In another embodiment, the non-radiation curable reinforcing agent includes (thio)urethane and/or (thio)urea groups.

As used herein, the term "curable" is intended to mean that a component, when exposed to a suitable source of curing energy, includes one or more curable functional groups capable of forming covalent bonds that participate in linking the component to itself or to other components of the curable composition to form a cured product. The cured product is a polymer. In one embodiment, the cured product is employed as a coating material on an optical fiber. The curing process may be induced by radiation or by thermal energy. In a preferred embodiment, curing is induced by radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. The radiation curing reaction occurs in the presence of a photosensitizer and a photoinitiator. A radiation-curable component may also optionally be thermally curable. A thermally-curable component is a component that can be induced to undergo a curing reaction when exposed to thermal energy of sufficient intensity for a sufficient period of time. A thermally curable component may also optionally be radiation curable.

A curable component includes one or more curable functional groups. A curable component with only one curable functional group is referred to herein as a monofunctional curable component. A curable component having two or more curable functional groups is referred to herein as a multifunctional curable component curable component. Multifunctional curable components include two or more functional groups capable of forming covalent bonds during the curing process and may introduce crosslinks into the cured product formed during the curing process. Multifunctional curable components that introduce crosslinks are also referred to herein as "crosslinkers" or "curable crosslinkers". Curable components include curable monomers and curable oligomers. Examples of functional groups that participate in covalent bond formation during the curing process are identified below.

As used herein, the terms "non-curable" and "non-radiation curable" refer to a component of a base coating composition that lacks functional groups capable of forming covalent bonds when exposed to the source of curing energy (radiation, thermal) during the curing process. The term "non-reactive" refers to a component of a base coating composition that does not react with other components of the base coating composition under the conditions used in curing the coating composition. Non-reactive components are also non-curable.

The curable monomer component of the curable coating composition is selected to be compatible with the oligomer or crosslinker, to provide a lower viscosity formulation (e.g. monomer diluent), and/or to influence the physical or chemical properties of the coating. The coating composition includes a single monomer or a combination of monomers. The coating composition includes one or more monofunctional monomers, one or more multifunctional monomers or a combination thereof. The monomers include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—$CH_2$—$CH_2$—), n-propoxylene (—O—$CH_2$—$CH_2$—$CH_2$—), isopropoxylene (—O—$CH_2$—$CH(CH_3)$—), etc. As used herein, the degree of alkoxylation refers to the number of alkoxylene groups in the monomer. In one embodiment, the alkoxylene groups are bonded consecutively in the monomer.

In embodiments, the curable monomer component of the coating composition includes one or more compounds having the general formula $R_2$—$R_1$—O—$(CH_2CH_3CH$—O$)_q$—COCH=$CH_2$, where $R_1$ and $R_2$ are aliphatic, aromatic, or a mixture of both, and q=1 to 10, or $R_1$—O—$(CH_2CH_3CH$—O$)_q$—COCH=$CH_2$, where $R_1$ is aliphatic or aromatic, and q=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the curable monomer component of the coating composition includes a multifunctional (meth) acrylate. As used herein, the term "(meth)acrylate" means acrylate or methacrylate. Multifunctional (meth)acrylates are (meth)acrylates having two or more curable (meth) acrylate functional groups per molecule, or three or more curable (meth)acrylate functional groups per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth)acrylate. In an embodiment, a multifunctional (meth)acrylate monomer is present in the curable coating composition at a concentration of from 0.05-15 wt %, or from 0.1-10 wt %.

In an embodiment, the coating composition includes one or more monofunctional (meth)acrylate monomers in an amount from 5-95 wt %, or from 30-75 wt %, or from 40-65 wt %. In another embodiment, the coating composition includes one or more monofunctional aliphatic epoxy acrylate monomers in an amount from 5-40 wt %, or from 10-30 wt %.

In an embodiment, the curable monomer component of the coating compositions includes an N-vinyl amide such as an N-vinyl lactam, or N-vinyl pyrrolidinone, or N-vinyl caprolactam, where the N-vinyl amide monomer is present at a concentration from 0.1-40 wt %, or from 2-10 wt %.

In an embodiment, the monomer component of the coating composition includes a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich).

In an embodiment, the hydroxyfunctional monomer is present in an amount sufficient to improve adhesion of the coating to the optical fiber. The hydroxyfunctional monomer is present in the coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the coating to the optical fiber. The use of the hydroxyfunctional monomer may also tend to increase the hydrophilicity of the coating. Hydroxyfunctional monomers are described in more detail in U.S. Pat. No. 6,563,996, the disclosure of which is hereby incorporated by reference in its entirety.

In different embodiments, the total monomer content of the coating composition is between about 5 wt % and about 95 wt %, or between about 30 wt % and about 75 wt %, or between about 40 wt % and about 65 wt %.

In some embodiments, the coating composition includes an N-vinyl amide monomer at a concentration of 0.1 to 40 wt % or 2 to 10 wt % in combination with an oligomeric material in accordance with the present disclosure in an amount from 5 to 95 wt %, or from 25 to 65 wt % or from 35 to 55 wt %.

In some embodiments, the coating composition includes one or more monofunctional (meth)acrylate monomers in an amount of from about 5 to 95 wt %; an N-vinyl amide monomer in an amount of from about 0.1 to 40 wt %; and an oligomeric material in accordance with the present disclosure in an amount of from about 5 to 95 wt %.

In some embodiments, the coating composition may include one or more monofunctional (meth)acrylate monomers in an amount of from about 40 to 65% by weight; an N-vinyl amide monomer in an amount of from about 2 to 10% by weight; and an oligomeric material in accordance with the present disclosure in an amount of from about 35 to 60% by weight.

The coating composition includes one or more monofunctional oligomers, one or more multifunctional oligomers or a combination thereof. Multifunctional oligomers are preferred. The oligomers include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated oligomers include alkoxylated oligomers with one or more acrylate or methacrylate groups. An alkoxylated oligomer is one that includes one or more alkoxylene groups, where an alkoxylene group has the form —O—R— and R is a linear or branched hydrocarbon. Examples of alkoxylene groups include ethoxylene (—O—$CH_2$—$CH_2$—), n-propoxylene (—O—$CH_2$—$CH_2$—$CH_2$—), isopropoxylene (—O—$CH_2$—$CH(CH_3)$—), etc. As used herein, the degree of alkoxylation refers to the number of alkoxylene groups in the monomer. In one embodiment, the alkoxylene groups are bonded consecutively in the monomer.

In embodiments, the curable oligomer component of the coating composition includes one or more compounds having the general formula $R_2$—$R_1$—O—($CH_2CH_3CH$—O$)_q$—COCH=$CH_2$, where $R_1$ and $R_2$ are aliphatic, aromatic, or a mixture of both, and q>10, or $R_1$—O—($CH_2CH_3CH$—O$)_q$—COCH=$CH_2$, where $R_1$ is aliphatic or aromatic, and q>10. Representative examples include ethylenically unsaturated monomers such as alkoxylated alkyl acrylates, polyether acrylates, ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the curable oligomer component of the coating composition includes a multifunctional (meth) acrylate. Examples of multifunctional (meth)acrylates include polyethylene glycol diacrylates, polypropylene glycol diacrylates, and polytetramethylene glycol diacrylates, alkoxylated glyceryl triacrylates such as ethosylated, propoxylated or butoxylated glyceryl triacrylates with aloxylation being 10 or greater, erythritol polyacrylates with alkoxylation and combinations thereof, In one embodiment, the curable oligomer component of the coating composition material includes urethane or urea compounds. In one embodiment, the curable oligomer component includes a polyether urethane acrylate compound. In another embodiment, the curable oligomer component includes a polyether urethane acrylate compound and a di-adduct compound. In one embodiment, the polyether urethane acrylate compound has a linear molecular structure.

In one embodiment, the oligomeric component is formed from a reaction between a diisocyanate compound, a diol or a polyol compound, and a hydroxy acrylate compound, where the reaction produces a polyether urethane acrylate compound. In one embodiment, the reaction produces a polyether urethane acrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts with isocyanate groups that are present in the composition formed from reaction of the diisocyanate compound and polyol compound. In one embodiment, the hydroxy acrylate compound reacts with terminal isocyanate groups to form terminal curable acrylate groups.

The diisocyanate compound in a reaction to form an oligomeric component is represented by molecular formula (I):

$$O=C=N-R_1-N=C=O \tag{I}$$

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

The polyol in a reaction to form an oligomeric component is represented by molecular formula (II):

$$\tag{II}$$

where $R_2$ includes an alkylene group. The alkylene group of $R_2$ is linear (e.g. methylene or ethylene), branched (e.g. isopropylene), or cyclic (e.g. phenylene). The polyol may be a polyalkylene oxide, such as polyethylene oxide, or a polyalkylene glycol, such as polypropylene glycol. The index x is a positive integer that represents the number of repeat units in the polyol. The index x may be at least 40, or at least 50, or at least 60, or at least 70, or at least 80, or at least 90, or at least 100, or between 40 and 100, or between 50 and 90, or between 60 and 80, or about 70. When $R_2$ is propylene, for example, the polyol has a number average molecular weight of about 2000 g/mol, or about 3000 g/mol, or about 4000 g/mol, or about 5000 g/mol, or in the range from 2000 g/mol-7000 g/mol, or in the range from 3000 g/mol-6000 g/mol, or in the range from 3500 g/mol-5500 g/mol. In some embodiments, the polyol is polydisperse and includes molecules spanning a range of molecular weights such that the totality of molecules combine to provide the number average molecular weight specified hereinabove.

The unsaturation of the polyol, as determined by ASTM Standard D4671, is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or in the range from 0.001 meq/g-0.15 meq/g, or in the range from 0.005 meq/g-0.10 meq/g, or in the range from 0.01 meq/g-0.10 meq/g, or in the range from 0.01 meq/g-0.05 meq/g, or in the range from 0.02 meq/g-0.10 meq/g, or in the range from 0.02 meq/g-0.05 meq/g.

The reaction to form an oligomeric component further includes addition of a hydroxy acrylate compound to react with terminal isocyanate groups present in unreacted starting materials (e.g. the diisocyanate compound) or products formed in the reaction of a diisocyanate compound with a polyol (e.g. urethane compounds with terminal isocyanate groups). The hydroxy acrylate compound reacts with terminal isocyanate groups to provide terminal acrylate groups for one or more constituents of the oligomeric component. In some embodiments, the hydroxy acrylate compound is present in excess of the amount needed to fully convert terminal isocyanate groups to terminal acrylate groups. The oligomeric component includes a single polyether urethane acrylate compound or a combination of two or more polyether urethane acrylate compounds.

The hydroxy acrylate compound in a reaction to form an oligomeric component is represented by molecular formula (III):

$$\tag{III}$$

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. In different embodiments, the hydroxy acrylate compound is a hydroxyalkyl acrylate, such as 2-hydroxyethyl acrylate or a hydroxyalkyl methacrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. In various embodiments, the water content of the hydroxy acrylate compound is at least 300 ppm, or at least 600 ppm, or at least 1000 ppm, or at least 1500 ppm, or at least 2000 ppm, or at least 2500 ppm.

In the foregoing exemplary molecular formulas (I), III), and (III), the groups $R_1$, $R_2$, and $R_3$ are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomeric component is formed by reacting a diisocyanate compound with a hydroxy acrylate compound and reacting the resulting product composition with a polyol. In another embodiment, the oligomeric component is formed by reacting a diisocyanate compound with a polyol compound and reacting the resulting product composition with a hydroxy acrylate compound.

In one embodiment, the oligomeric component is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. When p is 2.0, n is in the range from 3.0-5.0, or in the range from 3.0-4.5, or in the range from 3.2-4.8, or in the range from 3.4-4.6, or in the range from 3.6-4.4, and m is in the range from 1.50n-3 to 2.50n-5, or in the range from 1.55n-3 to 2.45n-5, or in the range from 1.60n-3 to 2.40n-5, or in the range from 1.65n-3 to 2.35n-5. For example, when p is 2.0 and n is 3.0, m is in the range from 1.5 to 2.5, or in the range from 1.65 to 2.35, or in the range from 1.80 to 2.20, or in the range from 1.95 to 2.05. For values of p other than 2.0, the molar ratio n:m:p scales proportionally. For example, the molar ratio n:m:p=4.0:3.0:2.0 is equivalent to the molar ratio n:m:p=2.0:1.5:1.0.

The mole number m may be selected to provide an amount of the hydroxy acrylate compound to stoichiometrically react with unreacted isocyanate groups present in the product composition formed from the reaction of diisocyanate compound and polyol used to form the oligomeric component. The isocyanate groups may be present in unreacted diisocyanate compound (unreacted starting material) or in isocyanate-terminated urethane compounds formed in reactions of the diisocyanate compound with the polyol. Alternatively, the mole number m may be selected to provide an amount of the hydroxy acrylate compound in excess of the amount needed to stoichiometrically react with any unreacted isocyanate groups present in the product composition formed from reaction of the diisocyanate compound and the polyol. The hydroxy acrylate compound is added as a single aliquot or multiple aliquots. In one embodiment, an initial aliquot of hydroxy acrylate is included in the reaction mixture used to form the oligomeric component and the product composition formed can be tested for the presence of unreacted isocyanate groups (e.g. using FTIR spectroscopy to detect the presence of isocyanate groups). Additional aliquots of hydroxy acrylate compound may be added to the product composition to stoichiometrically react with unreacted isocyanate groups (using, for example, FTIR spectroscopy to monitor a decrease in a characteristic isocyanate frequency (e.g. at 2260 $cm^{-1}$-2270 $cm^{-1}$) as isocyanate groups are converted by the hydroxy acrylate compound). In alternate embodiments, aliquots of hydroxy acrylate compound in excess of the amount needed to stoichiometrically react with unreacted isocyanate groups are added. As described more fully below, for a given value of p, the ratio of the mole number m to the mole number n influences the relative proportions of polyether urethane acrylate compound and di-adduct compound in the oligomeric component.

In one embodiment, the oligomeric component is formed from a reaction mixture that includes 4,4'-methylene bis (cyclohexyl isocyanate), 2-hydroxyethyl acrylate, and polypropylene glycol in the molar ratios n:m:p as specified above, where the polypropylene glycol has a number average molecular weight in the range from 2500 g/mol-6500 g/mol, or in the range from 3000 g/mol-6000 g/mol, or in the range from 3500 g/mol-5500 g/mol.

In one embodiment, the oligomeric component includes two compounds. The first compound is a polyether urethane acrylate compound having the molecular formula (IV), which may be prepared from an isocyanate compound, a polyol compound and a hydroxy acrylate compound as described above, (IV)

and the second compound is a di-adduct compound having the molecular formula (V):

(V)

where the groups $R_1$, $R_2$, and $R_3$ are as described hereinabove, y is a positive integer, and it is understood that the group $R_1$ in molecular formulas (IV) and (V) is the same as group $R_1$ in molecular formula (I), the group $R_2$ in molecular formula (IV) is the same as group $R_2$ in molecular formula (II), and the group $R_3$ in molecular formulas (IV) and (V) is the same as group $R_3$ in molecular formula (III). The di-adduct compound corresponds to the compound formed by reaction of both terminal isocyanate groups of the diisocyanate compound of molecular formula (I) with the hydroxy acrylate compound of molecular formula (III) where the diisocyanate compound has undergone no reaction with the polyol of molecular formula (II).

In one embodiment, the diadduct compound is produced as a byproduct of the reaction of diisocyanate compound, polyol compound, and hydroxy acrylate compound described above. Alternatively, the di-adduct compound is formed independent of the reaction used to form the oligomeric component and is added to the product of the reaction used to form the polyether urethane acrylate compound having molecular formula (IV) or to a purified form of the polyether urethane acrylate compound having the molecular formula (IV). The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. In some embodiments, the di-adduct compound is present in the oligomeric component in an amount of at least 1.0 wt %, or at least 1.5 wt %, or at least 2.0 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %-10.0 wt %, or in the range from 2.0 wt % to 9.0 wt %, or in the range from 3.0 wt % to 5.58.0 wt %, or in the range from 3.5 wt % to 7.0 wt %.

An illustrative reaction for synthesizing an oligomeric component in accordance with the present disclosure includes reaction of a diisocyanate compound (4,4'-methylene bis(cyclohexyl isocyanate, which is also referred to herein as H12MDI) and a polyol (polypropylene glycol with $M_n \sim 4000$ g/mol, which is also referred to herein as PPG4000) to form a polyether urethane isocyanate compound:

H12MDI~PPG4000~H12MDI~PPG4000~H12MDI where "~" denotes a urethane linkage formed by the reaction of a terminal isocyanate group of H12MDI with a terminal alcohol group of PPG4000 and ~H12MDI, ~H12MDI~, and ~PPG4000~ refer to residues of H12MDI and PPG4000 remaining after the reaction. The polyether urethane isocyanate compound has a repeat unit of the type ~(H12MDI~PPG4000)~. The particular polyether urethane isocyanate shown includes two PPG4000 units. The reaction may also provide products having one PPG4000 unit, or three or more PPG4000 units. The polyether urethane isocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane isocyanate compound forms the polyether urethane acrylate compound

HEA~H12MDI~PPG4000~H12MDI~PPG4000~H12MDI and/or the polyether urethane acrylate compound

HEA~H12MDI~PPG4000~H12MDI~PPG4000~H12MDI~HEA and reaction of HEA with unreacted H12MDI forms the di-adduct compound:

HEA~H12MDI~HEA where, as above, ~ designates a urethane linkage and ~HEA designates the residue of HEA remaining after reaction to form the urethane linkage. The combination of a polyether urethane acrylate compound and a di-adduct compound in the product composition constitutes an oligomeric component in accordance with the present disclosure.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

In one embodiment, the oligomeric component includes a first compound that is a polyether urethane acrylate compound of the type:

(hydroxy acrylate)~(diisocyanate~polyol)$_x$~diisocyanate~(hydroxy acrylate)

and a second compound that is a di-adduct compound of the type:

(hydroxy acrylate)~diisocyanate~(hydroxy acrylate)

where the relative proportions of diisocyanate compound, hydroxy acrylate compound, and polyol used in the reaction to form the oligomeric component correspond to the mole numbers n, m, and p disclosed hereinabove.

Compounds represented by molecular formulas (I) and (II) above, for example, react to form a polyether urethane isocyanate compound represented by molecular formula (VI):

(VI)

where y is the same as y in formula (IV) and is 1, or 2, or 3 or 4 or higher; and x is determined by the number of repeat units of the polyol (as described hereinabove).

Further reaction of the polyether urethane isocyanate of molecular formula (VI) with the hydroxy acrylate of molecular formula (III) provides the polyether urethane acrylate compound represented by molecular formula (IV) referred to hereinabove and repeated below:

where y is 1, or 2, or 3, or 4 or higher; and x is determined by the number of repeat units of the polyol (as described hereinabove).

In an embodiment, the reaction between the diisocyanate compound, hydroxy acrylate compound, and polyol yields a series of polyether urethane acrylate compounds that differ in y such that the average value of y over the distribution of compounds present in the final reaction mixture is a non-integer. In an embodiment, the average value of y in the polyether urethane isocyanates and polyether urethane acrylates of molecular formulas (VI) and (IV) corresponds to p or p−1 (where p is as defined hereinabove). In an embodiment, the average number of occurrences of the group $R_1$ in the polyether urethane isocyanates and polyether urethane acrylates of the molecular formulas (VI) and (IV) correspond to n (where n is as defined hereinabove).

The relative proportions of the polyether urethane acrylate and di-adduct compounds produced in the reaction are controlled by varying the molar ratio of the mole numbers n, m, and p. By way of illustration, the case where p=2.0 is considered. In the theoretical limit of complete reaction, two equivalents p of polyol would react with three equivalents n of a diisocyanate to form a compound having molecular formula (VI) in which y=2. The compound includes two terminal isocyanate groups, which can be quenched with subsequent addition of two equivalents m of a hydroxy acrylate compound in the theoretical limit to form the corresponding polyether urethane acrylate compound (IV) with y=2. A theoretical molar ratio n:m:p=3.0:2.0:2.0 is defined for this situation.

In the foregoing exemplary theoretical limit, a reaction of diisocyanate, hydroxy acrylate, and polyol in the theoretical molar ratio n:m:p=3.0:2.0:2.0 provides a polyether urethane acrylate compound having molecular formula (IV) in which y=2 without forming a di-adduct compound. Variations in the mole numbers n, m, and p provide control over the relative proportions of polyether urethane acrylate and di-adduct formed in the reaction. Increasing the mole number n relative to the mole number m or the mole number p, for example, may increase the amount of di-adduct compound formed in the reaction. In some embodiments, reaction of the diisocyanate compound, the hydroxy acrylate compound, and polyol compound uses molar ratios n:m:p, where n>3.0, such as where n is between 3.0 and 4.5, m is between 1.5n−3 and 2.5n−5, and p is 2.0, for example, to produce various amounts of the di-adduct compound in the oligomeric component.

Variations in the relative proportions of di-adduct and polyether urethane acrylate are obtained through changes in the mole numbers n, m, and p and through such variations, it may be possible to control the tensile toughness, tear strength, critical stress, and/or other mechanical properties of coatings formed from coating compositions that include the oligomeric component. For a polyether urethane compound with a given number of polyol units, oligomeric materials having variable proportions of di-adduct compound can be prepared. The variability in proportion of di-adduct compound can be finely controlled to provide oligomeric components based on a polyether urethane compound with a fixed number of polyol units that provide coatings that offer precise or targeted values of tensile toughness, tear strength, critical stress, and/or other mechanical properties.

Fiber coatings suitable for use as primary coating of optical fibers, for example, result when utilizing a coating composition that incorporates an oligomeric component that includes a polyether urethane acrylate compound represented by molecular formula (IV) and a di-adduct compound represented by molecular formula (V), where the concentration of the di-adduct compound in the oligomeric component is at least 1.0 wt %, or at least 1.5 wt %, or at least 2.0 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %−10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. The concentration of the di-adduct compound is controlled by varying the molar ratio n:m:p of diisocyanate:hydroxy acrylate:polyol. In accordance with some embodiments of the present disclosure, molar ratios n:m:p that are rich in diisocyanate relative to polyol promote the formation of the di-adduct compound.

In the exemplary stoichiometric ratio n:m:p=3:2:2 described hereinabove, the reaction proceeds with p equivalents of polyol, n=p+1 equivalents of diisocyanate, and two equivalents of hydroxy acrylate. If the mole number n exceeds p+1, the diisocyanate compound is present in stoichiometric excess relative to the amount of polyol compound needed to form the polyether urethane acrylate of molecular formula (IV). The presence of excess diisocyanate shifts the distribution of reaction products toward enhanced formation of the di-adduct compound.

To promote formation of the di-adduct compound from excess diisocyanate compound, the amount of hydroxy acrylate can also be increased. For each equivalent of diisocyanate above the stoichiometric mole number n=p+1, two equivalents of hydroxy acrylate are needed to form the di-adduct compound. In the case of arbitrary mole number p (polyol), the stoichiometric mole numbers n (diisocyanate) and m (hydroxy acrylate) are p+1 and 2, respectively. As the mole number n is increased above the stoichiometric value, the equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane acrylate compound (compound having molecular formula (V)) and the term 2[n−(p+1)] represents the equivalents of hydroxy acrylate needed to convert the excess starting diisocyanate to the di-adduct compound. If the actual value of the mole number m is less than this number of equivalents, the available hydroxy acrylate reacts with isocyanate groups present on the oligomer or free diisocyanate molecules to form terminal acrylate groups. The relative kinetics of the two reaction pathways dictates the relative amounts of polyether urethane acrylate and di-adduct compounds formed and the deficit in hydroxy acrylate relative to the amount required to quench all unreacted isocyanate groups may be controlled to further influence the relative proportions of polyether urethane acrylate and di-adduct formed in the reaction.

In some embodiments, the reaction includes heating the reaction composition formed from the diisocyanate compound, hydroxy acrylate compound, and polyol. The heating facilitates conversion of terminal isocyanate groups to terminal acrylate groups through a reaction of the hydroxy acrylate compound with terminal isocyanate groups. In different embodiments, the hydroxy acrylate compound is present in excess in the initial reaction mixture and/or is otherwise available or added in unreacted form to effect conversion of terminal isocyanate groups to terminal acrylate groups. The heating occurs at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

The curable coating composition further includes a photoinitiator. The photoinitiator facilitates initiation of the curing reaction and formation of a cured product from the coating composition. In one embodiment, the curing reaction is a polymerization reaction and the photoinitiator enhances the rate of the polymerization reaction. Photoinitiators include ketonic photoinitiating additives and/or phosphine oxide additives. The photoinitiator is present in an amount sufficient to enable rapid radiation curing. The concentration of photoinitiator in the coating composition is greater than 0.1 wt %, or greater than 0.25 wt %, or greater than 0.50 wt %, or greater than 0.75 wt %, or greater than 1.0 wt %, or in the range from 0.1 wt %-10.0 wt %, or in the range from 0.1 wt %-5.0 wt %, or in the range from 0.1 wt %-2.5 wt %, or in the range from 0.25 wt %-5.0 wt %, or in the range from 0.25 wt %-2.5 wt %. The wavelength of curing radiation is infrared, visible, or ultraviolet. Curing can be accomplished with a lamp source (e.g. Hg lamp) or LED source (e.g. a UVLED or visible LED).

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The curable coating composition further includes a photosensitizer. The photosensitizer is a compound that absorbs the curing radiation and enhances the rate of the curing reaction. In one embodiment, the photosensitizer interacts with the photoinitiator to modify the photoinitiator to a form that enhances the rate of photoinitiation to increase the rate of the curing reaction. Interaction of the photosensitizer with the photoinitiator includes a chemical interaction and/or a physical interaction. Chemical interactions include chemical reaction, complex formation, hydrogen abstraction, or catalysis. Physical interactions include energy transfer. In one embodiment, interaction of the photosensitizer with the photoinitiator is induced by absorption of the curing radiation by the photosensitizer and/or photoinitiator. In one example, the photosensitizer absorbs curing radiation and is placed into an excited state and the excited state of the photosensitizer interacts with the photoinitiator via a physical (e.g. energy transfer) or chemical (e.g. hydrogen abstraction) mechanism. In one embodiment, transfer of energy from an excited state of a photosensitizer to a photoinitiator induces or accelerates unimolecular decomposition of a photoinitiator to form free radicals. In another embodiment, the photosensitizer acts as a donor of an atom (e.g. hydrogen) or electron to a photo-excited state of the photoinitiator to increase the rate of generation of free radicals. In another example, the photosensitizer absorbs curing radiation and decomposes into two or more fragments, at least one of which interacts with the photoinitiator to enhance the rate of the curing reaction. In one embodiment, the fragment of the photosensitizer that interacts with the photoinitiator is a free radical. In other embodiments, the photosensitizer increases cure speed through a combination of two or more of the mechanisms described herein.

Representative photosensitizers include DETX (2,4-diethyl-9H-thioxanthen-9-one, available from IGM Resins), ITX (isopropylthioxanthone, available from IGM Resins), anthracene (available from Aldrich), triphenylene (available from Aldrich), and anthraquinone (available from Aldrich). The concentration of photosensitizer in the coating composition is greater than 0.1 wt %, or greater than 0.25 wt %, or greater than 0.50 wt %, or greater than 0.75 wt %, or greater than 1.0 wt %, or in the range from 0.1 wt %-5.0 wt %, or in the range from 0.1 wt %-2.5 wt %, or in the range from 0.1 wt %-1.0 wt %, or in the range from 0.25 wt %-5.0 wt %, or in the range from 0.25 wt %-2.0 wt %, or in the range from 0.25 wt %-1.0 wt %.

In addition to monomer component(s), oligomer component(s), photosensitizer(s), and photoinitiator(s), the coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the coating composition (e.g., protect against de-polymerization or oxidative degradation).

An adhesion promoter is a compound that facilitates adhesion of the coating and/or coating composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl) benzene (available from United Chemical Technologies (Bristol, Pa.)); see U.S. Pat. No. 6,316,516, the disclosure of which is hereby incorporated by reference in its entirety herein.

The adhesion promoter is present in the coating composition in an amount between 0.02 pph and 10.0 pph, or between 0.05 pph and 4.0 pph, or between 0.1 pph and 4.0 pph, or between 0.1 pph and 3.0 pph, or between 0.1 pph and 2.0 pph, or between 0.1 pph and 1.0 pph, or between 0.5 pph and 4.0 pph, or between 0.5 pph and 3.0 pph, or between 0.5 pph and 2.0 pph, or between 0.5 pph to 1.0 pph.

Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl)trimethoxy-silane, and dodecyl mercaptan. The strength additive may be present in the coating composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxy-phenyl) propionate] (e.g., IRGANOX 1035, available from BASF).

Representative amine synergists include triethanolamine; 1,4-diazabicyclo[2.2.2]octane (DABCO), triethylamine, and methyldiethanolamine. In an embodiment, an amine synergist is present at a concentration of 0.02 pph-0.5 pph.

EXAMPLES

Cure Speed.

Coatings made from the curable coating compositions form at fast cure speeds. For purposes of the present disclosure, cure speed refers to the cure speed determined by the following procedure:

Cure speeds were measured by using FTIR spectroscopy to monitor the conversion of acrylate double bonds to single bonds as a function of time. The area of the —C=C— band extending from 1396 cm$^{-1}$-1419 cm$^{-1}$ was monitored. The band had peak intensity at about 1410 cm$^{-1}$. Cure speed measurements analyze the rate of cure of a material during exposure to curing radiation. Cure speed measurements are related to degree of cure measurements in that the disappearance of the acrylate species is measured. However, the degree of cure is a static measurement, which is performed on a finished cured product. Cure speed is a dynamic measurement that monitors the curing reaction during the curing process as the coating composition evolves to form a coating (cured product). From one perspective, the cure speed can be regarded as a series of degree of cure measurements taken over a period of time during exposure to curing radiation. The end result of the cure speed measurement is a plot of degree of cure vs. time. For purposes of the present description, the degree of cure is expressed as % cure, a quantity described below.

All cure speed data disclosed herein were acquired using a Bruker Vertex 80 FTIR spectrometer operating in Rapid Scan mode. Thin films (1 mil wet thickness) of uncured coating were drawn on an ASI DuraSamplir® equipped with a 3 mm diamond coated zinc selenide DuraDisc® and an Omega CN76000 temperature controller. The sample chamber was purged for ~30 s with house nitrogen. The sample was irradiated for 1 s using a Lesco Super Spot Mk II spot cure system (mercury lamp curing source) or a Lesco Cool Cure LED system (395 nm LED curing source). The temperature of the thin film sample of uncured coating composition was 55° C. when curing was initiated and the curing intensity was 4.0 mW/cm². Exposure time was controlled using a UniBlitz® VS25 with model T132 driver. Spectra were obtained before, during, and after the 1 second exposure at a rate of 1 scan every 35 ms. The sample was then irradiated with a 10 s exposure to complete the cure and monitored for several scans.

Percent cure (% cure) values were calculated from the peak area (PA) of the acrylate band extending from 1396 cm$^{-1}$-1419 cm$^{-1}$ using the following formula:

$$\% \text{ cure} = \frac{PA_{uncured} - PA_{sample}}{PA_{uncured} - PA_{fully\ cured}} \times 100$$

$PA_{uncured}$ corresponds to the uncured peak area before exposure to curing radiation, $PA_{fully\ cured}$ corresponds to the peak area of the fully cured state, and $PA_{sample}$ corresponds to the peak area at intermediate times between the uncured and fully cured states. The % cure represents the time-dependent conversion of acrylate double bonds and may also be referred to herein as conversion or % conversion. Conversion values were calculated independently for each spectrum acquired during the time period monitored and conversion vs. time plots were constructed.

Figure 3:
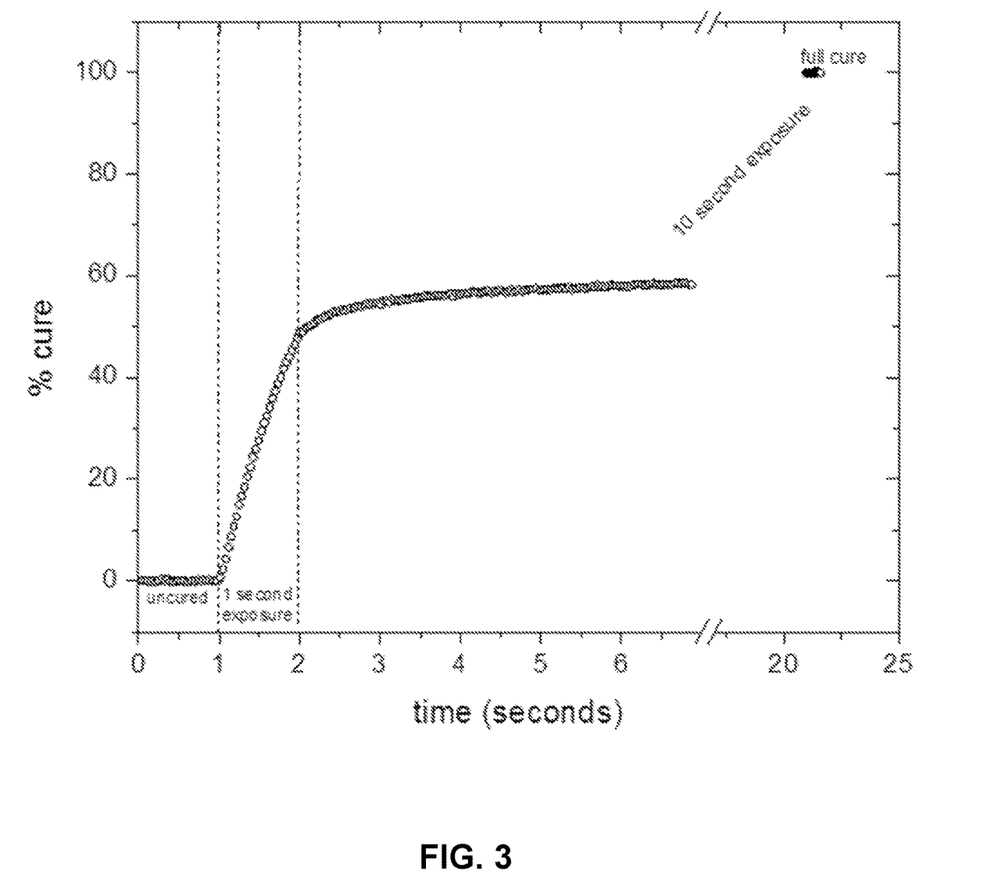
FIG. 3 depicts a schematic conversion plot used to monitor the curing reaction of a coating composition.

A schematic conversion vs. time plot is shown in FIG. 3. Conversion is reported as % cure as defined in the equation above. In the time period between 0 sec and 1 sec, spectra of the uncured composition were acquired and the % cure was zero. At a time of 1 sec, the curing reaction was initiated by exposing the thin film sample of coating composition to curing radiation (mercury lamp or 395 nm LED) and allowed to continue for 1 sec. At a time of 2 sec, the curing radiation was turned off. A rapid increase in % cure occurs upon exposure of the coating composition to the curing radiation. The curing process was monitored with the curing source turned off between 2 sec and 7 sec. The curing source was turned on between 7 sec and 17 sec to provide a 10 sec exposure period to finish the cure. No spectra were acquired during the 10 sec exposure period. After the curing source was turned off, spectra of the final state were measured beginning at a time of about 20 sec. In the illustrative example shown in FIG. 3, the % cure after the 10 sec exposure was essentially 100%. Whether or not a fully cured state was obtained under the curing conditions described in FIG. 3 depended on the coating composition. The timing and exposure of cure described for FIG. 3 were used to obtain data for the conversion plots of the coating compositions described herein.

Cure speed is a measure of the rate of the curing reaction and can be obtained from the slope of a conversion plot of the type shown in FIG. 3. As is evident from FIG. 3, the slope changes as the curing reaction proceeds. The evolution of the physical state of the system during the curing reaction influences the cure speed. In the early stages of curing, the coating composition is more fluid (less viscous). As curing proceeds and conversion increases, the coating composition becomes more viscous and ultimately becomes rigid as a solid coating is formed. When the coating composition becomes sufficiently viscous, the curing reaction becomes diffusion limited and cure speed is influenced by both the kinetics of the curing reaction and diffusivity of the compounds in the coating composition.

To avoid the effect of diffusion on cure speed, cure speed is defined on the basis of conversion before the curing reaction becomes diffusion limited. More specifically, cure speed is defined as the slope of the conversion plot between 10% and 40% conversion. The slope of the conversion plot between 10% and 40% conversion was observed to be nearly constant in the measurements performed in the examples described herein (see below). The nearly constant slope indicates that the curing reaction is dominated by the kinetics of the curing reaction for conversions below 40% and that the reaction becomes diffusion limited at some conversion above 40%. Cure speeds reported herein were determined according to this procedure and have units of %/sec, where % refers to % cure.

In addition to cure speed, Young's modulus and tensile toughness were measured for coatings prepared from the present coating compositions. Procedures used to determine Young's modulus and tensile toughness are described below.

Young's Modulus and Tensile Toughness.

Young's modulus (E) was measured on films formed by curing the coating compositions. Wet films of the coating composition were cast on silicone release paper with the aid of a draw-down box having a gap thickness of about 0.005". The wet films were cured with a UV dose of 1.2 J/cm$^2$ (measured over a wavelength range of 225-424 nm by a Light Bug model IL490 from International Light) using a Fusion Systems UV curing apparatus with a 600 W/in D-bulb (50% Power and approximately 12 ft/min belt speed) to yield cured coatings in film form. Cured film thickness was between about 0.0030" and 0.0035".

The films were allowed to age (23° C., 50% relative humidity) for at least 16 hours prior to testing. Film samples were cut to dimensions of 12.5 cm×13 mm using a cutting template and a scalpel. Young's modulus and tensile toughness were measured on the film samples using a MTS Sintech tensile test instrument following procedures set forth in ASTM Standard D882-97. Young's modulus is defined as the steepest slope of the beginning of the stress-strain curve. Tensile toughness is defined as the integrated area under the stress-strain curve. Films were tested at an elongation rate of 2.5 cm/min with the initial gauge length of 5.1 cm.

The curing characteristics of curable coating compositions with the formulations shown in Table 1 were investigated. The top row lists sample labels for each of the coating compositions and the left column lists the components in each composition. The amount of each component is expressed as wt % or pph as indicated.

The same oligomer was used for each of the compositions listed in Table 1. The oligomer was an oligomeric material prepared from H12MDI (4,4'-methylene bis(cyclohexyl isocyanate), PPG4000 (polypropylene glycol with $M_n$~4000 g/mol) and HEA (2-hydroxyethyl acrylate) in accordance with the reaction scheme described hereinabove. The oligomeric material formed by the reaction was an oligomeric material of the type shown in formula (IV) above with a di-adduct compound of the type shown in formula (V) above. All reagents were used as supplied by the manufacturer and were not subjected to further purification. H12MDI was obtained from Aldrich. PPG4000 was obtained from Covestro. HEA was obtained from Kowa. In the preparation, 27.8 g of H12MDI, 12.3 g of HEA, and 209.9 g of PPG4000 were used. The molar ratio n:m:p was 4:4:2, where n refers to the relative molar amount of H12MDI, m refers to the relative molar amount of HEA, and p refers to the relative molar amount of PPG4000.

The oligomeric material was prepared by mixing the H12MDI (4,4'-methylene bis(cyclohexyl isocyanate)) with dibutyltin dilaurate and 2,6-di-tert-butyl-4 methylphenol at room temperature in a 500 mL flask. The 500 mL flask was equipped with a thermometer, a $CaCl_2$ drying tube, and a stirrer. While continuously stirring the contents of the flask, the PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C.-75° C. for about 1-1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 cm$^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C.-75° C. for about 1-1½ hours. FTIR analysis was conducted on the reaction mixture to assess the presence of isocyanate groups and the process was repeated until enough supplemental HEA was added to fully react any unreacted isocyanate

TABLE 1

Coating Compositions

| | LCP | PTPO3 | PDX05 | PDX373 | PIX05 | PDX371 | PDX374 |
|---|---|---|---|---|---|---|---|
| Oligomer (wt. %) | 50.0 | 50.0 | 50.0 | 50.0 | 50.0 | 50.0 | 50.0 |
| M164 (wt. %) | 46.5 | 45.0 | 46.0 | 37.0 | 46.0 | 37.0 | 37.0 |
| NVC (wt. %) | 2.0 | 2.0 | 2.0 | 2.0 | 2.0 | 2.0 | 2.0 |
| TPO (wt. %) | 1.5 | 3.0 | 1.5 | 1.5 | 1.5 | 1.5 | 1.5 |
| DETX (wt. %) | — | — | 0.5 | 0.5 | — | 0.5 | 0.5 |
| CN373 (wt. %) | — | — | — | 9.0 | — | — | — |
| ITX (wt. %) | — | — | — | — | 0.5 | — | — |
| CN371 (wt. %) | — | — | — | — | — | 9.0 | — |
| CN374 (wt. %) | — | — | — | — | — | — | 9.0 |
| Mercapto Silane (pph) | 0.8 | 0.8 | 0.8 | 0.8 | 0.8 | 0.8 | 0.8 |
| Irganox 1035 (pph) | 1.0 | 1.0 | 1.0 | 1.0 | 1.0 | 1.0 | 1.0 |
| Tetrathiol (pph) | 0.032 | 0.032 | 0.032 | 0.032 | 0.032 | 0.032 | 0.032 | groups. The reaction was deemed complete when no appreciable isocyanate stretching intensity was detected in the FTIR measurement.

The concentration (wt %) of di-adduct compound in the oligomeric material was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 µm, specified molecular weight range=200-400,000 g/mol). The third column (column 3) was sold under Part No. PL1110-6520 by Agilent Technologies and was packed with PLgel 100A stationary phase (polystyrene divinyl benzene copolymer, average particle size=5 µm, specified molecular weight range=up to 4,000 g/mol). The columns were calibrated with polystyrene standards ranging from 162-6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 µL, and run time=35 min (isocratic conditions). The detector was a Waters Alliance 2410 differential refractometer operated at 40° C. and sensitivity level 4. The samples were injected twice along with a THF+0.05% toluene blank.

The amount (wt %) of di-adduct in the oligomeric material was quantified using the preceding GPC system and technique. A calibration curve was obtained using standard solutions containing known amounts of the di-adduct compound (HEA~H12MDI~HEA) in THF. Standard solutions with di-adduct concentrations of 115.2 µg/g, 462.6 µg/g, 825.1 µg/g, and 4180 µg/g were prepared. (As used herein, the dimension "µg/g" refers to µg of di-adduct per gram of total solution (di-adduct+THF)). Two 100 µL aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)=0.999564).

The di-adduct concentration in the oligomeric material was determined using the calibration. Samples were prepared by diluting-0.10 g of oligomeric material in THF to obtain a ~1.5 g test solution. The test solution was run through the GPC instrument and the area of the peak associated with the di-adduct compound was determined. The di-adduct concentration in units of µg/g was obtained from the peak area and the calibration curve, and was converted to wt % by multiplying by the weight (g) of the test solution and dividing by the weight of the sample of oligomeric material before dilution with THF. The wt % of di-adduct compound in the oligomeric material was determined to be 5.0 wt %.

The components listed in Table 1 are as follows: M164 is ethoxylated(4)nonylphenol acrylate (available from Miwon) and functions as a monomer. NVC is N-vinylcaprolactam, available from ISP Technologies) and functions as a monomer. TPO is 2,4,6-trimethylbenzoyl)diphenyl phosphine oxide (available from BASF under the trade name Lucirin) and functions as a photoinitiator. DETX is 2,4-diethyl-9H-thioxanthen-9-one (available from IGM Resins) and functions as a photosensitizer. ITX is isopropylthioxanthone (available from IGM Resins) and functions as a photosensitizer. CN373 is a proprietary monofunctional amine acrylate (available from Sartomer) and functions as a monomer. CN371 is proprietary difunctional amine acrylate (available from Sartomer) and functions as a monomer. CN374 is proprietary difunctional amine acrylate (available from Sartomer) and functions as a monomer. Irganox 1035 is thiodiethylene bis[3-(3,5-di-tert-butyl)-4-hydroxy-phenyl) propionate] (available from BASF under the trade name Irganox 1035) and functions as an antioxidant. Mercaptosilane is 3-mercaptopropyl trimethoxysilane (available from Aldrich) and functions as an adhesion promoter. Tetrathiol is pentaerythritoltetrakis(3-mercaptopropionate) (available from Aldrich) and functions as a quencher of residual dibutyltin dilaurate catalyst that may be present in the oligomeric material.

The coating compositions of Table 1 were each formulated using a high-speed mixer in an appropriate container heated to 60° C., with a heating band or heating mantle. In each case, the components were weighed into the container using a balance and allowed to mix until the solid components were thoroughly dissolved and the mixture appeared homogeneous. Curable compositions were formulated such that the amounts of oligomer, monomer, photosensitizer, and photoinitiator total 100 wt %; the remaining components were added to the total mixture in units of pph as described above. The oligomer and monomer(s) were blended together for at least 10 minutes at 60° C. Photoinitiator(s), photosensitizer(s), and additives were then added, and blending was continued for one hour. Finally, the adhesion promoter was added, and blending was continued for 30 minutes.

Figure 4:
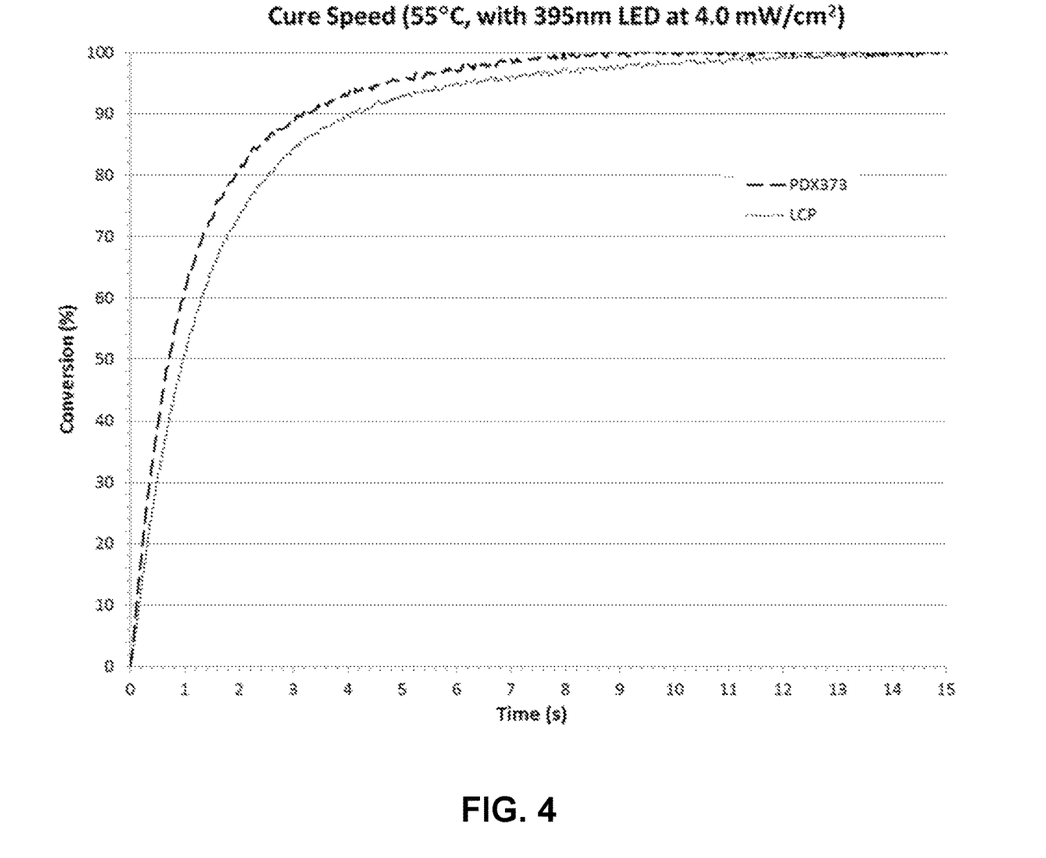
FIG. 4 depicts representative conversion (% cure) plots for two coating compositions.

Cure speed was measured for thin film samples of each coating composition using the procedure described above. The results are shown in Table 2. Cure speed was determined for samples at 55° C. using a mercury (Hg) lamp and an LED operating at 395 nm as described above and is reported as % cure/s. Three trials for each coating composition were completed. The reported cure speed is the average value with standard deviation. Representative plots of conversion as a function of time are shown in FIG. 4 for coating compositions LCP and PDX373.

TABLE 2

Cure Speed of Coating Compositions

| Coating Composition | Cure Speed (Hg lamp) | Cure Speed (395 nm LED) |
|---|---|---|
| LCP | 60 ± 2 | 56 ± 2 |
| PTPO3 | 68 ± 2 | 68 ± 1 |
| PDX05 | 69 ± 2 | 72 ± 2 |
| PDX373 | 75 ± 2 | 79 ± 2 |
| PIX05 | 67 ± 2 | 66 ± 1 |
| PDX371 | 57 ± 3 | 67 ± 3 |
| PDX374 | 58 ± 1 | 64 ± 1 |

The data indicate that inclusion of a photosensitizer leads to a significant improvement in cure speed for coating compositions with similar components. Coating compositions LCP and PDX05, for example, have essentially the same composition and differ with respect to the presence of a photosensitizer. Both coating composition LCP and coating composition PDX05 have a photoinitiator concentration of 1.5 wt %. Coating composition PDX05, however, further includes 0.5 wt % of photosensitizer. The cure speed for coating composition PDX05 is significantly faster than the cure speed for coating composition LCP for excitation with both an Hg lamp curing source and a 395 nm curing source. A comparison of coating compositions PDX05 and PTPO3 reveals similar cure speeds for coating compositions with similar compositions despite the fact that the photoinitiator concentration in coating composition PTPO3 is twice the photoinitiator concentration in coating composition PDX05. A similar conclusion is drawn from a comparison of the cure speeds of coating composition PTPO3 and PIX05.

The results indicate that inclusion of a photosensitizer has the effect of increasing the reactivity of the photoinitiator. Although similar cure speeds are observed for coating composition PTPO3 because of the higher photoinitiator concentration, it is preferable to minimize photoinitiator concentration for reasons of cost and because of the limited solubility of common photoinitiators in many coating compositions. The solubility of photoinitiators in most coating compositions preferred for optical fibers is low and imposes a practical limit on the degree to which cure speed can be increased by increasing photoinitiator concentration. Limitations in cure speed due to low photoinitiator solubility are overcome in the present coating compositions through inclusion of a photosensitizer.

The cure speed of the present coating compositions, when cured at 55° C. with a mercury lamp or an LED operating at a curing intensity of 4.0 mW/cm², is greater than 50% cure/s, or greater than 55% cure/s, or greater than 60% cure/s, or greater than 65% cure/s, or greater than 70% cure/s, or in the range from 50% cure/s-85% cure/s, or in the range from 55% cure/s-80% cure/s, or in the range from 60% cure/s-75% cure/s.

Young's modulus and tensile toughness were determined for coatings formed form coating compositions LCP and PDX05. The results are shown in Table 3 and indicate that the higher cure speed observed for coating composition PDX05 does not compromise tensile properties of the coating. As is the case for coating formed from coating composition LCP, coatings formed from coating composition PDX05 exhibit tensile properties suitable for use as a primary coating for optical fibers.

TABLE 3

Tensile Properties

| Coating Composition | Young's Modulus | Tensile Toughness |
|---|---|---|
| LCP | 0.70 MPa | 838 kJ/m³ |
| PDX05 | 0.88 MPa | 717 kJ/m³ |

Coating formed from the present coating compositions have a Young's modulus less than 1.0 MPa, or less than 0.90 MPa, or less than 0.80 MPa, or less than 0.75 MPa, or in the range from 0.50 MPa-1.0 MPa, or in the range from 0.60 MPa-0.90 MPa, or in the range from 0.65 MPa-0.85 MPa.

Coatings formed from the present coating compositions have a tensile toughness greater than 600 kJ/m³, or greater than 650 kJ/m³, or greater than 700 kJ/m³, or greater than 750 kJ/m³, or in the range from 600 kJ/m³-800 kJ/m³, or in the range from 650 kJ/m³-750 kJ/m³.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A coating composition comprising:
    an oligomer component, the oligomer component comprising the reaction product of a composition that includes:
        a diisocyanate compound;
        a hydroxy (meth)acrylate compound; and
        a polyol compound,
        wherein the diisocyanate compound, the hydroxy (meth)acrylate compound and the polyol compound are present in the molar ratio n:m:p, respectively, where n is in the range from 3.0 to 5.0, m is in the range from 1.50n-3 to 2.50n-5, and p is 2; and
    a photosensitizer.

2. The coating composition of claim 1, wherein said diisocyanate compound comprises a compound having the formula:

O═C═N—R$_1$—N═C═O wherein the group R$_1$ comprises an alkylene group.

3. The coating composition of claim 2, wherein the group R$_1$ comprises a 4,4'-methylenebis(cyclohexyl) group.

4. The coating composition of claim 1, wherein the hydroxy (meth)acrylate compound comprises a compound having the formula:

wherein the group R$_3$ comprises an alkylene group.

5. The coating composition of claim 1, wherein the polyol compound comprises a compound having the formula:

H—O—(R$_2$—O)$_x$—H wherein the group R$_2$ comprises an alkylene group and x is between 40 and 100.

6. The coating composition of claim 1, wherein n is in the range from 3.4 to 4.6 and m is in the range from 1.60n-3 to 2.40n-5.

7. The coating composition of claim 1, wherein the reaction product comprises:
    a polyether urethane acrylate compound having the molecular formula:

wherein
R$_1$, R$_2$ and R$_3$ are independently selected from linear alkylene groups, branched alkylene groups, or cyclic alkylene groups;
y is 1, 2, 3, or 4; and
x is between 40 and 100.

8. The coating composition of claim 7, wherein y is 1 or 2.

9. The coating composition of claim 8, wherein x is between 60 and 80.

10. The coating composition of claim 7, wherein R$_1$ comprises a 4,4'-methylenebis(cyclohexyl) group.

11. The coating composition of claim 10, wherein R$_2$ comprises a propylene group and R$_3$ comprises a linear alkyl group.

12. The coating composition of claim 11, wherein y=1.

13. The coating composition of claim 7, wherein the oligomer component further comprises a di-adduct compound having the molecular formula:

14. The coating composition of claim 13, wherein the di-adduct compound is present in the reaction product in an amount of at least 1.0 wt %.

15. The coating composition of claim 13, wherein the di-adduct compound is present in the reaction product in an amount of at least 2.35 wt %.

16. The coating composition of claim 1, further comprising:
a monomer, the monomer comprising a radiation-curable functional group; and
a photoinitiator.

17. The coating composition of claim 16, wherein the coating composition has a cure speed greater than 60% cure/s when cured at 55° C. with a curing source, the curing source comprising a mercury lamp or an LED.

18. The coating composition of claim 16, wherein the concentration of the photoinitiator is less than 3.0 wt %.

19. The coating composition of claim 18, wherein the concentration of the photosensitizer is in the range from 0.25 wt %-1.0 wt %.

20. The cured product of the coating composition of claim 16.

21. The cured product of claim 20, wherein the cured product has a Young's modulus less than 0.90 MPa and a tensile toughness greater than 650 mJ/cm$^3$.

22. An optical fiber comprising the cured product of the coating composition of claim 16.

* * * * *

UNITED STATES PATENT AND TRADEMARK OFFICE
CERTIFICATE OF CORRECTION

PATENT NO.        : 10,377,918 B2  
APPLICATION NO.   : 16/118706  
DATED             : August 13, 2019  
INVENTOR(S)       : Yangbin Chen Page 1 of 1

It is certified that error appears in the above-identified patent and that said Letters Patent is hereby corrected as shown below:

On the Title Page

Column 2, item (57), Abstract, Line 4, delete "photo sensitizer" and insert -- photosensitizer --, therefor.

Signed and Sealed this  
Twenty-fifth Day of February, 2020

Andrei Iancu  
*Director of the United States Patent and Trademark Office*